(12) United States Patent
Hazeltine

(10) Patent No.: US 8,163,261 B2
(45) Date of Patent: Apr. 24, 2012

(54) SYSTEM AND METHOD FOR MAKING $SI_2H_6$ AND HIGHER SILANES

(75) Inventor: Bruce Hazeltine, Washington, NJ (US)

(73) Assignee: Voltaix, LLC, North Branch, NJ (US)

( * ) Notice: Subject to any disclaimer, the term of this patent is extended or adjusted under 35 U.S.C. 154(b) by 640 days.

(21) Appl. No.: 11/099,097

(22) Filed: Apr. 5, 2005

(65) Prior Publication Data

US 2006/0222583 A1   Oct. 5, 2006

(51) Int. Cl.
| C01B 33/04 | (2006.01) |
| C01B 33/02 | (2006.01) |
| C01B 6/00 | (2006.01) |
| B32B 9/00 | (2006.01) |
| B32B 25/00 | (2006.01) |
| B32B 9/04 | (2006.01) |
| D02G 3/00 | (2006.01) |

(52) U.S. Cl. ........ 423/347; 423/349; 423/645; 428/391; 428/405; 428/447

(58) Field of Classification Search .............. 423/347, 423/342, 341, 349, 645, 391, 405, 447; 65/488; 428/47, 391, 405, 447, 478, 680, 700, 763, 428/778; 204/164
See application file for complete search history.

(56) References Cited

U.S. PATENT DOCUMENTS

| 4,016,188 | A |   | 4/1977 | Kotzsch et al. |
| 4,026,246 | A | * | 5/1977 | Colle et al. ............... 122/225 R |
| 4,808,392 | A |   | 2/1989 | Itoh et al. |
| 4,950,373 | A |   | 8/1990 | Sundermeyer et al. |
| 5,730,390 | A |   | 3/1998 | Plichta et al. |
| 6,027,705 | A | * | 2/2000 | Kitsuno et al. ............... 423/347 |
| 6,451,277 | B1 | * | 9/2002 | Lord ............................. 423/349 |
| 6,858,196 | B2 |   | 2/2005 | Todd et al. |
| 2006/0222583 | A1 | * | 10/2006 | Hazeltine ..................... 423/347 |

OTHER PUBLICATIONS

Johnson, W.C., et al., Hydrogen Compounds of Silicon I, The Preparation of Mono and Disilane by J. Am. Chem. Soc. vol. 57, 1349-1353 (1935).
Purnell, J. H., et al., The Pyrolysis of Monosilane, Proc. Roy. Soc. Lond. A. 293, 543-561 (1966).
Bowrey, N., et al., The Pyrolysis of Disilane and Rate Constants of Silane Insertion Reactions, Proc. Roy. Soc. Lond. A. 321, 341-359 (1971).

(Continued)

Primary Examiner — Jerry Lorengo
Assistant Examiner — Jennifer Smith
(74) Attorney, Agent, or Firm — Ryndak & Suri LLP

(57) ABSTRACT

A method for making a higher silane from a lower silane comprises heating a lower silane containing stream without exposing it to temperatures more than 20° C. more than the maximum temperature of a first reaction temperature range. The heated lower silane containing stream is introduced into a first reaction zone and allowed to react. The method further comprises mixing a first gaseous mixture from the first reaction zone with a higher silane containing stream and introducing the mixed streams into a second reaction zone operating within a second reaction temperature range. A second gaseous mixture exiting the second reaction zone is separated into various streams. One stream containing unreacted lower silanes is recycled to an earlier heating step and first reaction zone. The higher silane containing stream is mixed with the first gaseous mixture. Average residence time is low to prevent decomposition and formation of undesired silane byproducts.

52 Claims, 2 Drawing Sheets

OTHER PUBLICATIONS

Tebben, E.M., et al., Pyrolysis of Disilane and Trisilane, Inorg. Chem. vol. 8, No. 8, 1787-1789 (1969).

Martin, J. G. et al., Thermal Decomposition Kinetics of Polysilanes, Int'l J. of Chemical Kinetics, vol. 22, 613-632.

Gokhale et al., Synthesis of the Higher Silanes and Germanes, J. Inorg. Nucl. Chem. 1965.

Horvath, et al., Production of Higher Silanes in Radio Frequency SiH4 and H2-SiH4 Plasmas, J. App. Physics, vol. 96, No. 12, Dec. 15, 2004, pp. 7660-7664.

Dzarnoski et al., Shock-Induced Kinetics of theDisilane Decomposition and Silylene Reactions with Trimethylsilane and Butadiene, Organometallics, vol. 1,No. 9, 1217-1220(1982).

Martin, J. G. et al., The Decomposition Kinetics of Disilane and the Heat of Formation of Silylene, Int'l. J. of Chemical Kinetics, vol. 19, 715-724 (1987).

Slootman, Homogeneous Gas-Phase Nucleation in Silane Pyrolysis, J. Aerosol Sci., vol. 25, No. 1, 15-21 (1994).

Vanderwielen, Kinetics of the Thermal Decomposition of Methyldisilane and Trisilane, J. Am. Chem. Soc., vol. 97, No. 5, 993-998 (1975).

USPTO, International Search Report and Written Opinion of the International Searching Authority for PCT/US/12323, Oct. 24, 2006.

* cited by examiner

SYSTEM AND METHOD FOR MAKING SI$_2$H$_6$ AND HIGHER SILANES

TECHNICAL FIELD

The present invention relates to a system and a process for producing higher silanes useful in engineered silicon materials including semiconductors.

BACKGROUND OF THE INVENTION

Silicon semiconductor devices have become nearly ubiquitous in society. They can be found in portable devices such as MP3 players, watches, cell phones, etc. They can be found in most vehicles. They can be found in the workplace in computers, PDAs, telephone systems, elevators, and in numerous other products. They can also be found in homes in microwaves, TVs, radios, refrigerators, toys, just to name a few. The ever increasing presence of silicon chips makes it increasingly important to find new ways to manufacture silicon chips for less.

Currently monosilane is used in the manufacture of silicon chips and generally in making materials having films of polycrystalline silicon, epitaxial silicon or amorphous silicon. The monosilane is decomposed at very high temperatures. Because higher silanes including disilane and trisilane are more easily decomposed than monosilane and are low in loss by evaporation during film formation, it is possible to attain a decrease in the film forming temperature, an improvement in the film forming rate and an increase in the formed film yield by using higher silanes. Thus a need exists to manufacture higher silanes cheaply and in large amounts.

Higher silanes can be manufactured by pyrolysis. However at the high temperatures used for pyrolysis much of the monosilane is converted into elemental silicon, a useless byproduct. Hence, a need exists for a method of making higher silanes with less waste.

The manufacture of higher silanes by pyrolysis also creates undesirable other silanes. Silicon chip manufacturing requires a very high purity feed. Removing large quantities of impurities wastes reactants and desired products and requires expensive purification. This wastes starting material and requires additional purification. Thus, a need exists for a method creating less impurities.

SUMMARY OF THE INVENTION

In accordance with the present invention, novel methods are provided for making disilane, trisilane, and other higher silanes. In accordance with one aspect of the invention, a method is provided for making a higher or higher than higher silane from a lower silane, including, but not limited to making disilane from monosilane, trisilane from disilane, and trisilane from monosilane. The method includes heating a first lower silane containing stream so that the stream is in a first reaction temperature range while avoiding exposing the stream to a temperature greater than about 20° C. more than the maximum temperature of the first reaction temperature range. Preferably the stream is not exposed to a temperature greater than about 10° C. more than the maximum temperature of the first reaction temperature range. Preferably the lower silane containing stream is at a pressure in excess of atmospheric pressure and contains less than 20% by volume non-reacting diluents such as hydrogen. Preferably when making trisilane from disilane, the first reaction temperature range is within from about 250° C. to about 450° C. Preferably when making disilane from monosilane, the first reaction temperature range is within from about 350° C. to about 550° C.

Next the heated first lower silane containing stream within the reaction temperature range is introduced into the first reaction zone where it is maintained within the reaction temperature range to form a higher silane reaction product. Preferably the first reaction zone has an average residence time of about 15 seconds to about 60 seconds. Preferably less than 20%, more preferably less than 10%, even more preferably less than 6%, and most preferably less than 3% of the lower silane is converted to the higher silane in each pass through the first reaction zone. The first reaction zone is a volume maintained within the reaction temperature range. It may include a catalyst. A first gaseous mixture containing the lower silane and the higher silane formed in the first reaction zone exits the first reaction zone.

In a first embodiment, the first gaseous mixture is purified to produce the higher silane. In a second embodiment, the first gaseous mixture is used to make a higher than higher silane. In the first embodiment, the first gaseous mixture is separated into a first higher silane containing stream having a relatively high concentration of the higher silane and a second lower silane containing stream having a relatively high concentration of the lower silane. Preferably, the higher silane containing stream is separated from any higher than higher silane impurities to purify the higher silane containing stream.

The second lower silane containing stream is heated so that the second stream is in a first reaction temperature range while avoiding exposing the second stream to a temperature greater than about 20° C. more than the maximum temperature of the first reaction temperature range and is introduced into the first reaction zone. Preferably, the second lower silane containing stream and the first lower silane containing stream are combined before they are heated to a temperature within the reaction temperature range.

In the second embodiment, the first gaseous mixture and a second higher silane containing stream having a relatively higher concentration of the higher silane than the first gaseous mixture are introduced into a second reaction zone to form a higher than higher silane. The first gaseous mixture and the higher silane stream can be mixed together before introduction into the second reaction zone.

A second gaseous mixture exits the second reaction zone. It contains the lower silane, the higher silane, and a higher than higher silane. It is separated into a third lower silane containing stream having a relatively high amount of the lower silane, into the higher silane containing stream, and into a higher than higher silane containing stream having a relatively high amount of the higher than higher silane. Preferably the higher than higher silane containing stream undergoes an additional separation to remove impurities.

The third lower silane containing stream is heated so that the third stream is in a first reaction temperature range while avoiding exposing the third stream to a temperature greater than about 20° C. more than the maximum temperature of the first reaction temperature range and is introduced into the first reaction zone. Preferably the third lower silane containing stream is not exposed to a reaction temperature greater than about 10° C. more than the maximum temperature of the first reaction temperature range.

DETAILED DESCRIPTION OF THE INVENTION

Figure 1:
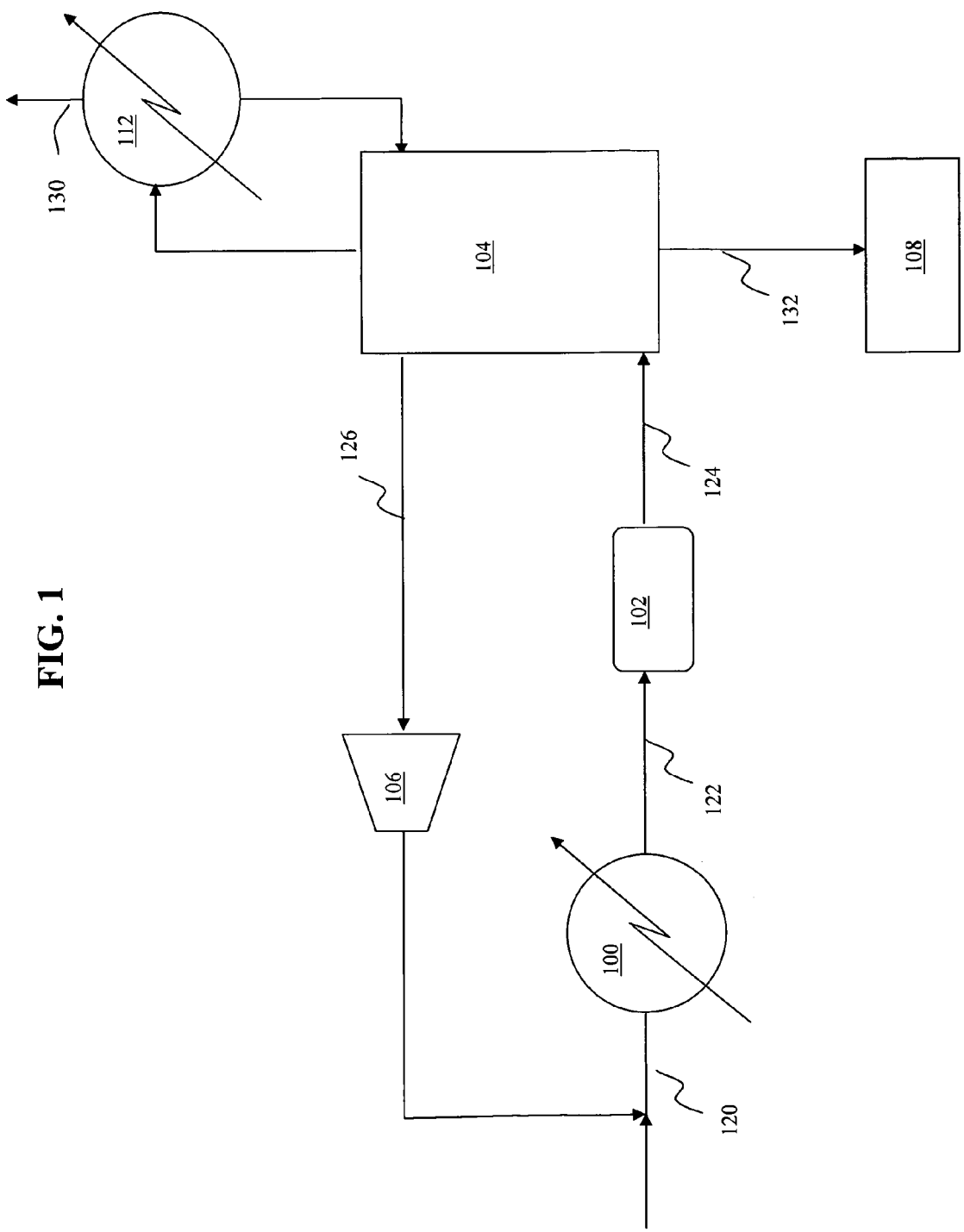
FIG. 1 is a process flow diagram for making disilane and higher silanes.

The invention may have 1, 2, or more reaction zones. In one embodiment, there is one reaction zone as shown in FIG. 1. A single reaction zone process is most useful for making a higher silane from a lower silane, for example, disilane from monosilane, trisilane from disilane, tetrasilane from trisilane, etc. A first lower silane containing stream 120 is introduced into a preheater 100. Preheater 100 heats lower silane containing stream 120 to a temperature within the first reaction temperature range.

Preferably, preheater 100 heats the first lower silane containing stream 120 rapidly, more preferably in less than 20 seconds, even more preferably in less than 10 seconds, even more preferably in less than 6 seconds, and most preferably less than 1 second. Preheater 100 could heat this rapidly by exposing first lower silane containing stream 120 to hot wall temperatures. However, this would encourage the thermal decomposition of the silanes and the formation of undesirable higher than higher silanes. Consequently, the wall surface exposed to the lower silane containing stream should have a temperature not more than about 25° C. more than the maximum temperature of the first reaction temperature range, preferably not more than about 20° C., more preferably not more than about 15° C., and most preferably not more than about 10° C.

Preheater 100 has a conventional design. It consists of a metal pipe wrapped in electrical resistance heaters, and in insulation. First lower silane containing stream 120 flows inside the pipe. Temperature probes can be provided to modulate the power output of the heaters to ensure that lower silane stream 120 is not exposed to overly hot temperatures. In order to heat quickly, the pipe preferably has a relatively small diameter.

Preheater 100 heats first lower silane containing stream 120 to form a heated lower silane containing stream 122, which is introduced into a first reactor or first reaction zone 102. First reaction zone 102 is designed to maintain the temperature of heated lower silane containing stream 122 within the reaction temperature range. The lower limit of the first reaction temperature range is the minimum temperature below which the reaction for making the higher silane does not appreciably occur. The upper limit is the maximum temperature to which lower silane containing stream 120 and heated lower silane containing stream 122 are heated. Preferably, if the lower silane is monosilane and the higher silane is disilane, the first reaction temperature range is within from about 350° C. to about 550° C., more preferably from about 400° C. to about 500° C., even more preferably from about 425° C. to about 475° C., and most preferably from about 440° C. to about 460° C. Preferably, if the lower silane is disilane and the higher silane is trisilane, the first reaction temperature range is within from about 250° C. to about 450° C., more preferably from about 280° C. to about 400° C., even more preferably from about 305° C. to about 375° C., and most preferably from about 330° C. to about 350° C.

First reaction zone 102 can be a pipe wrapped in electrical resistance heaters and insulation like the preheater. However, because the heat transfer requirements for first reaction zone 102 is much less than preheater 100, the electrical resistance heaters can have a lower power output and the diameter of first reaction zone 102 can be larger. For convenience, first reaction zone 102 and preheater 100 are separate. However, they can in fact be part of the same piece of equipment.

Preferably, the residence time within first reaction zone 102 is relatively short, preferably less than about 5 minutes, more preferably less than about 2 minutes, and most preferably, between about 15 seconds and about 60 seconds. The low residence time tends to reduce the conversion rate per pass, but boosts the overall output of the higher silane as it reduces the amount of higher silane that decomposes and the formation of undesirable higher than higher silanes. Preferably, the conversion rate per pass is less than 20%, more preferably less than 10%, even more preferably less than 6%, and most preferably less than 3%.

A first gaseous mixture 124 exits first reaction zone 102. Gaseous mixture 124 contains predominantly lower silane, some higher silane, and smaller amounts of higher than higher silanes. It may also contain hydrogen and lower than lower silanes. Gaseous mixture 124 is introduced into a distillation tower 104. Distillation tower 104 has a condenser 112 that uses liquid nitrogen to condense and separate gaseous mixture 124 into an overhead stream 130 containing relatively high amounts of hydrogen and/or lower than lower silanes, a higher silane containing stream 132 containing relatively high amounts of the higher silane, and a second lower silane containing stream 126 that is recycled back to preheater 100. Overhead stream 130 exits the system. Higher silane containing stream 132 is collected in the pot 108 of distillation column 104 so that it can be further purified by distillation to remove undesirable higher than higher silanes after the reaction process has been shut down.

Figure 2:
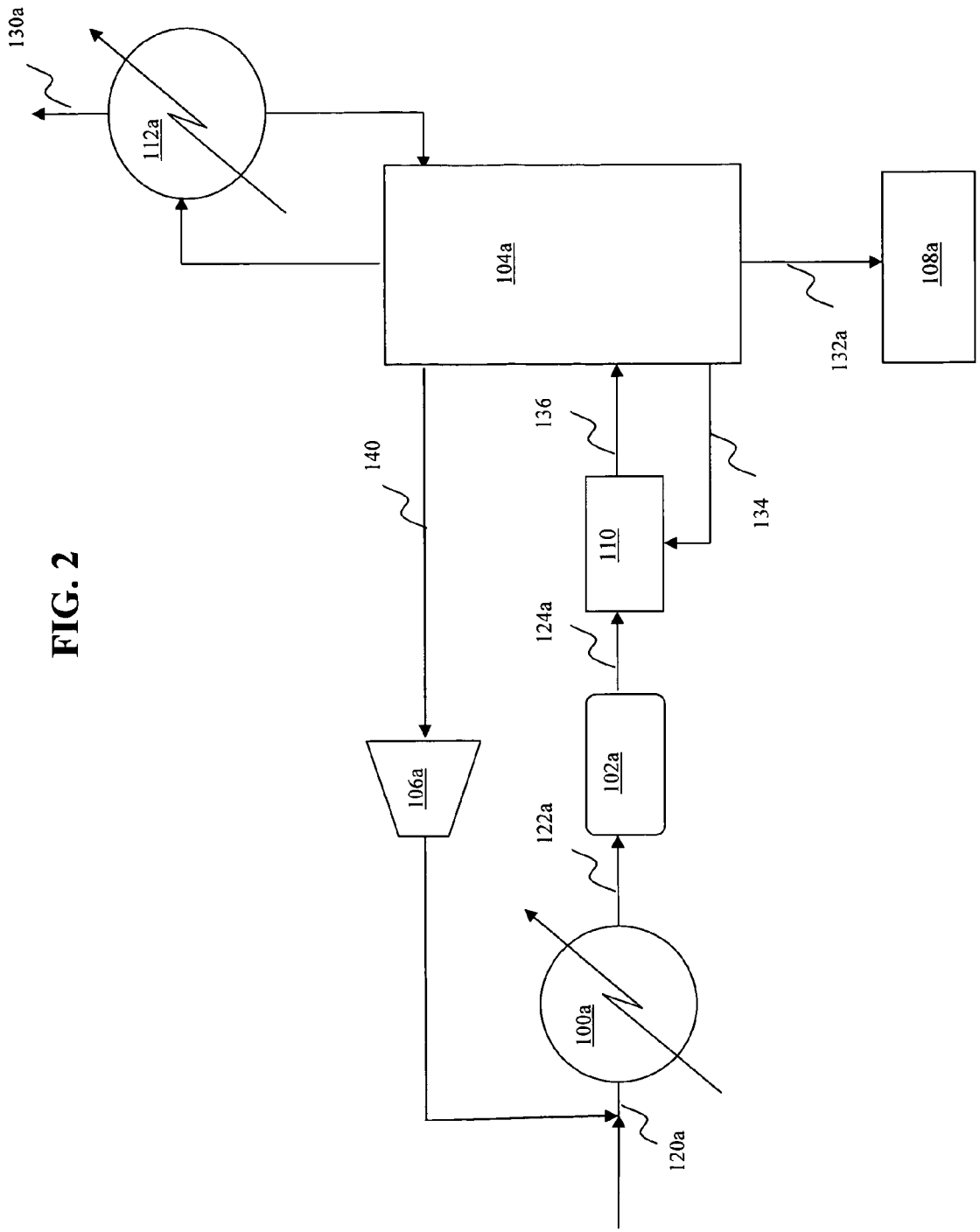
FIG. 2 is a process flow diagram for making trisilane and higher silanes.

In a second embodiment, the process has two reaction zones as shown in FIG. 2. The process is particularly well suited for making a higher than higher silane from a lower silane, for example, trisilane from monosilane, tetrasilane from disilane, etc. The process has a preheater 100*a* and a first reaction zone 102*a*. If the process is used to make trisilane from monosilane, preheater 100*a*, first reaction zone 102*a*, lower silane containing stream 120*a*, and heated lower silane stream 122*a* can be the same as preheater 100, first reaction zone 102, lower silane containing stream 120, and heated lower silane stream 122 for making disilane from monosilane in the first embodiment. The first gaseous mixture 124*a* exiting first reaction zone 102*a* is introduced into a second reaction zone 110 and mixed with a second higher silane containing stream 134. Alternatively first gaseous mixture 124*a* can be mixed with second higher silane containing stream 134 before being introduced into second reaction zone 110.

Preferably, second higher silane containing stream 134 is at a temperature and is of a flow rate so that first gaseous mixture 124*a* is cooled to a temperature within a second temperature range better suited for converting higher silane into a higher than higher silane. If the higher than higher silane is trisilane and the higher silane is disilane, preferably the second reaction temperature range is within from about 250° C. to about 450° C., more preferably from about 280° C. to about 400° C., even more preferably from about 305° C. to about 375° C., and most preferably from about 330° C. to about 350° C.

Because the temperatures conducive to creating a higher than higher silane are conducive to creating undesirable higher than higher than higher silanes, it is desirable to minimize the amount of time in the second reaction temperature range. In fact, it is believed that it might be desirable that second higher silane containing stream 134 is at a temperature and is of a flow rate so that first gaseous mixture 124*a* is cooled down to a temperature below 350° C. and preferably below 300° C. when streams 134 and 124*a* are completely mixed together. It is also believed that it may be preferable that the mixing occur rapidly. By designing the system so that streams 134 and 124*a* rapidly mix to achieve a temperature below 350° C. and preferably below 300° C., there is very little time for reactions consuming higher than higher silanes.

Second reaction zone 110 can be similar to first reaction zone 102a in design. A second gaseous mixture 136 exits second reaction zone 110 and is introduced into distillation column 104a.

Distillation column 104a has four outputs. The first output is an overhead stream 130a containing predominantly hydrogen and a lower than lower silane. Overhead stream 130a exits the system. A higher than higher silane containing stream 132a having relatively high amounts of the higher than higher silane is another output. It is allowed to collect into the pot 108a of distillation column 104a for distillation to remove impurities such as the higher silane and any higher than higher than higher silanes after reaction zones 102a and 110 have been shut down. A third output is a third lower silane containing stream 140 having relatively high amounts of the lower silane. Third lower silane containing stream 140 is recycled back to preheater 100a. A fourth output is a second higher silane containing stream 134 having relatively large amounts of the higher silane. It is introduced to second reaction zone 110 or mixed with first gaseous mixture 124a before introduction to second reaction zone 110. Second higher silane containing stream 134 may be further cooled or heated prior to its introduction into second reaction zone 110 or mixture with the first gaseous mixture 124a.

In general for both embodiments, the pressure of lower silane containing streams 120 and 120a and the pressure of first gaseous mixture 124 and 124a can be any pressure as long as the reactants are gaseous. Preferably, the pressure is more than atmospheric. Increasing the pressure above atmospheric allows for smaller equipment and it makes any distillations or condensations easier to perform.

Preferably reaction zones 102, 102a, and 110, and preheaters 100 and 100a are designed to operate in plug flow. More preferably, preheaters 100 and 100a are designed to operate in highly turbulent flow to provide high heat transfer rates. Such high heat transfer rates are not necessary for reaction zones 102, 102a and 110. Flow rates and pipe diameters for reaction zones and preheaters should be sized accordingly. In addition, baffles and distribution plates may be used to prevent uneven flow distributions and channeling. Maldistribution may create hot spots thereby resulting in the decomposition of silane.

Hydrogen is believed to limit the decomposition of silane because it is a byproduct of that decomposition. However, in general for both embodiments, the concentration of non-reacting diluents, such as hydrogen, in lower silane containing streams 120 and 120a can be less than 20% by volume, and can be less than about 10%. This allows for smaller equipment sizes and increases the efficiency of separations. In particular, reducing the concentration of diluent greatly reduces the size of condensers 112 and 112a. Because of the low residence times in first reaction zone 102 and 102a and the gentle heating of lower silane containing stream 120 and 120a, having low concentrations of diluents does not result in excessive decomposition of silanes into silica and hydrogen. On the other hand, it may be desirable to have concentrations of diluents higher than 20% when condenser size is less important.

In accordance with the present invention, disilane, trisilane, and higher silanes can be produced cheaply and abundantly from a lower silane such as monosilane. The use of a preheater, not exposing the process streams to overly hot temperatures, and minimizing the residence time minimizes the creation of undesirable silane impurities and minimizes the decomposition of reactants and products into elemental silicon. In the two reactor zone process, the mixing of the first gaseous mixture 124a and the second higher silane containing stream 134 rapidly quenches the hot gaseous mixture achieving control over the residence time at higher temperatures minimizing waste and impurities.

Example 1

Approximately 16 kg/hr of disilane at 30 psia was fed to a pre-heater where it was heated to 350° C. The preheater was constructed of approximately 30 feet of ⅜" diameter 316 stainless steel tubing. The first reactor has a volume of about 50 L and had a length to diameter ratio of approximately 5:1. The reactor was held at 350° C. Byproduct silane and any hydrogen was removed as an overhead stream. The outlet gas from the reactor was composed of 4.1% monosilane, 93.5% disilane, 2.17% trisilane, and 0.15% tetrasilane. No higher silanes or hydrogen were detected.

Example 2

The conditions were the same as example 1 except an 8 L reactor was used. The outlet gas from the reactor was composed of 2.124% monosilane, 96.67% disilane, 1.138% trisilane, and 0.07% tetrasilane. No higher silanes or hydrogen were detected.

Example 3

The equipment was the same as example 2. 2.5 kg/hr of monosilane was heated to 460° C. Silane was not purged in the overhead. The outlet gas from the reactor was composed of 98.33% monosilane, 1.414% disilane, 0.236% trisilane, and 0.019% tetrasilane. No higher silanes or hydrogen were detected.

Example 4

The conditions were the same as example 3 except 3.4 kg/hr of monosilane was heated to 440° C. The outlet gas from the reactor was composed of 99.63% monosilane, 0.341% disilane, and 0.027% trisilane. No higher silanes or hydrogen were detected.

What is claimed is:

1. A method for producing a higher silane from a lower silane comprising:
   heating a first lower silane containing stream to a first temperature within a first pyrolysis temperature range causing pyrolysis of the first lower silane in a preheater;
   introducing the first lower silane containing stream heated in the preheater into a first reaction zone;
   maintaining the temperature in the first reaction zone within the first pyrolysis temperature range to form a higher silane reaction product from the first lower silane containing stream introduced into the first reaction zone; and
   modulating a power output of the preheater to avoid exposing the first lower silane containing stream to temperatures greater than about 20° C. above the first temperature for reducing the production of silicon and other higher silanes in the preheater.

2. The method of claim 1 wherein the higher silane is trisilane, the lower silane is disilane and the first pyrolysis temperature range is within from about 250° C. to about 450° C.

3. The method of claim 1 wherein the higher silane is disilane, the lower silane is monosilane and the first pyrolysis temperature range is within from about 350° C. to about 550° C.

4. The method of claim 1 further comprising maintaining the temperature in the first reaction zone in the first pyrolysis temperature range, wherein said heating occurs in about 6 seconds or less and the first reaction zone has an average residence time of about 15 seconds to about 60 seconds.

5. The method of claim 1 wherein the first lower silane containing stream optionally comprises non-reacting diluents in an amount less than 20% by volume of said first lower silane containing stream.

6. The method of claim 1 wherein the first lower silane containing stream is not exposed to temperatures greater than about 10° C. above the first temperature.

7. The method of claim 1 wherein less than 20% of the lower silane is converted to the higher silane in each pass through the first reaction zone.

8. The method of claim 7 wherein less than 3% of the lower silane is converted to the higher silane in each pass through the first reaction zone.

9. The method of claim 7 further comprising:
introducing a first gaseous mixture from the first reaction zone into a distillation unit and distilling the first gaseous mixture into a first higher silane containing stream having a relatively high concentration of the higher silane and a second lower silane containing stream having a relatively high concentration of the lower silane; and
thereafter heating the second lower silane containing stream so that the second stream is in the first pyrolysis temperature range while avoiding exposing the second stream to temperatures greater than about 20° C. above the maximum temperature of the first pyrolysis temperature range; and thereafter
introducing the heated second lower silane containing stream within the first pyrolysis temperature range into the first reaction zone.

10. The method of claim 1 wherein a first gaseous mixture comprising higher and lower silanes exits the first reaction zone and the method further comprises:
separating the first gaseous mixture into a first higher silane containing stream having a relatively high concentration of the higher silane and a second lower silane containing stream having a relatively high concentration of the lower silane; and
heating the second lower silane containing stream so that the second stream is in the first pyrolysis temperature range while avoiding exposing the second stream to temperatures greater than about 20° C. above the maximum temperature of the first pyrolysis temperature range; and
introducing the heated second lower silane containing stream within the first pyrolysis temperature range into the first reaction zone.

11. The method of claim 10 wherein said separating of said first gaseous mixture comprises distilling in a distillation column and said first gaseous mixture is introduced in said distillation column from said first reaction zone, the first higher silane containing stream is obtained from the distillation column as a bottoms, and the second lower silane containing stream is obtained from the distillation column as a side draw.

12. The method of claim 10 wherein the second lower silane containing stream and the first lower silane containing stream are combined before the second lower silane containing stream is heated to a temperature within the first pyrolysis temperature range.

13. The method of claim 10 wherein the higher silane containing stream comprises the higher silane, the lower silane, and various higher than higher silanes and the method further comprises separating the higher silane containing stream from the higher than higher silanes to purify the higher silane containing stream.

14. The method of claim 1 wherein a first gaseous mixture comprising higher and lower silanes exits the first reaction zone and the method further comprises introducing the first gaseous mixture and a second higher silane containing stream having a relatively higher concentration of the higher silane than the first gaseous mixture in a second reaction zone to form a higher than higher silane.

15. The method of claim 14 wherein the first gaseous mixture and the higher silane containing stream are mixed together before introduction into the second reaction zone.

16. The method of claim 14 wherein a second gaseous mixture comprising lower, higher and higher than higher silanes exits the second reaction zone and the method further comprises:
separating the second gaseous mixture into a third lower silane containing stream having a relatively high amount of the lower silane, into a higher silane containing stream, and into a higher than higher silane containing stream having a relatively high amount of the higher than higher silane;
heating the third lower silane containing stream so that the third stream is in the first pyrolysis temperature range while avoiding exposing the third stream to a temperature greater than about 20° C. above the first pyrolysis temperature range; and
introducing the heated third lower silane containing stream within the first pyrolysis temperature range into the first reaction zone.

17. The method of claim 16 wherein said separating of said second gaseous mixture comprises distilling in a distillation column, said second gaseous mixture is introduced in said distillation column from said second reaction zone, the third lower silane containing stream is obtained from the distillation column as a side draw, the higher silane containing stream is obtained from the distillation column as a second side draw, and the higher than higher silane containing stream is obtained from the distillation column as a bottoms.

18. The method of claim 16 wherein the higher than higher silane is trisilane, the higher silane is disilane, the lower silane is monosilane, the first pyrolysis temperature range is within about 350° C. to about 550° C., and the second reaction zone has a temperature within about 250° C. to about 450° C.

19. The method of claim 16 wherein the higher than higher silane has the formula $Si_{n+2}H_{2n+6}$, the higher silane has the formula $Si_{n+1}H_{2n+4}$, and the lower silane has the formula $Si_n H_{2n+2}$, where n is an integer greater than 0.

20. The method of claim 16 wherein the third lower silane containing stream is not exposed to a reaction temperature greater than about 10° C. above the first pyrolysis temperature range.

21. The method of claim 19 wherein the higher than higher silane containing stream comprises the higher than higher silane and various impurities and the method further comprising separating the higher than higher silane containing stream from the impurities to purify the higher than higher silane containing stream.

22. The method of claim 1 wherein heating the first lower silane containing stream comprises heating a disilane stream so that the stream is in the first pyrolysis temperature range within from about 280° C. to about 400° C.

23. The method of claim 1 wherein heating the first lower silane containing stream comprises heating a monosilane stream so that the stream is in the first pyrolysis temperature range within from about 400° C. to about 500° C.

24. The method of claim 1 wherein diluents are present in the first reaction zone in an amount of less than 20% by volume.

25. The method of claim 1 further comprising:
introducing a first gaseous mixture from the first reaction zone into a distillation unit and distilling the first gaseous mixture into a first higher silane containing stream having a relatively high concentration of the higher silane and a second lower silane containing stream having a relatively high concentration of the lower silane; and
thereafter heating the second lower silane containing stream so that the second stream is in the first pyrolysis temperature range while avoiding exposing the second stream to temperatures greater than about 20° C. above the maximum temperature of the first pyrolysis temperature range; and thereafter
introducing the heated second lower silane containing stream within the first pyrolysis temperature range into the first reaction zone.

26. The method of claim 1 wherein the first lower silane containing stream is heated in a turbulent flow regime.

27. The method of claim 1 wherein the preheater comprises one or more heaters having power outputs and wherein the modulating a power output of the preheater comprises modulating the heater power outputs.

28. A method for producing a higher silane from a lower silane comprising:
heating a first lower silane containing stream optionally comprising non-reacting diluents less than 20% by volume of said first lower silane containing stream to a first temperature within a first pyrolysis temperature range causing pyrolysis of the first lower silane by contacting the first lower silane with a heated surface maintained at a temperature no more than about 20° C. above the first temperature for reducing the production of silicon and other higher silanes;
introducing the heated first lower silane containing stream within the first pyrolysis temperature range into a first reaction zone; and
maintaining the temperature in the first reaction zone in the first pyrolysis temperature range, wherein said heating occurs in about 6 seconds or less and the first reaction zone has an average residence time of about 15 seconds to about 60 seconds.

29. The method of claim 28 wherein the pressure of the lower silane containing stream is in excess of atmospheric pressure.

30. The method of claim 29 wherein a first gaseous mixture comprising higher and lower silanes exits the first reaction zone and the method further comprises:
separating the first gaseous mixture into a higher silane containing stream having a relatively high concentration of the higher silane and a second lower silane containing stream having a relatively high concentration of the lower silane; and
heating the second lower silane containing stream so that the second stream is in the first pyrolysis temperature range while avoiding exposing the second stream to a temperature greater than about 20° C. above the first pyrolysis temperature range; and
introducing the heated second lower silane containing stream within the first pyrolysis temperature range into the first reaction zone.

31. The method of claim 29 wherein a first gaseous mixture comprising higher and lower silanes exits the first reaction zone and the method further comprises:
introducing the first gaseous mixture and a higher silane containing stream having a relatively higher concentration of the higher silane than the first gaseous mixture in a second reaction zone to form a higher than higher silane, wherein a second gaseous mixture comprising lower, higher and higher than higher silanes exits the second reaction zone;
separating the second gaseous mixture into a third lower silane containing stream having a relatively high amount of the lower silane, into the higher silane containing stream, and into a higher than higher silane containing stream having a relatively high amount of the higher than higher silane;
heating the third lower silane containing stream so that the third stream is in a first pyrolysis temperature range while avoiding exposing the third stream to a temperature greater than about 20° C. above the first pyrolysis temperature range; and
introducing the heated third lower silane containing stream within the first pyrolysis temperature range into the first reaction zone.

32. The method of claim 31 wherein the higher than higher silane is trisilane, the higher silane is disilane, the lower silane is monosilane, the first pyrolysis temperature range is within from about 350° C. to about 550° C., and the second reaction zone has a temperature within from about 250° C. to about 450° C.

33. The method of claim 31 wherein said separating of said second gaseous mixture comprises distilling in a distillation column, said second gaseous mixture is introduced in said distillation column from said second reaction zone, the higher silane containing stream is obtained from the distillation column as a second side draw, and the higher than higher silane containing stream is obtained from the distillation column as a bottoms.

34. The method of claim 28 wherein heating the first lower silane containing stream comprises heating a monosilane stream so that the stream is in the first pyrolysis temperature range within from about 400° C. to about 500° C.

35. The method of claim 28 further comprising:
introducing a first gaseous mixture from the first reaction zone into a distillation unit and distilling the first gaseous mixture into a first higher silane containing stream having a relatively high concentration of the higher silane and a second lower silane containing stream having a relatively high concentration of the lower silane; and thereafter
heating the second lower silane containing stream so that the second stream is in the first pyrolysis temperature range while avoiding exposing the second stream to temperatures greater than about 20° C. above the maximum temperature of the first pyrolysis temperature range; and thereafter
introducing the heated second lower silane containing stream within the first pyrolysis temperature range into the first reaction zone.

36. The method of claim 28 wherein the first lower silane containing stream is heated in a turbulent flow regime.

37. A method of making trisilane from one or more lower silanes comprising:
mixing a first gas stream comprising monosilane in a first pyrolysis temperature range when mixing with a disilane containing stream to quench the first gas stream, the disilane containing stream having a relatively higher concentration of disilane than the first gas stream, the mixing forming a second gas stream, the quenching of the first gas stream reducing the production of silicon and other higher silanes, wherein the disilane containing stream is at a lower temperature than the first gas stream and is of a flow rate so the second gas stream is formed within a third trisilane producing temperature range, wherein the first temperature range of the first gas stream is from about 400° C. to about 500° C. and the third trisilane producing temperature range of the second gas stream is from about 305° C. to about 375° C. or wherein the first temperature range of the first gas stream is from about 425° C. to about 475° C. and the third trisilane producing temperature range of the second gas stream is from about 280° C. to about 400° C.

38. The method of claim 37 further comprising distilling the second gas stream to form the disilane containing stream, the disilane stream being enriched in disilane relative to the second gas stream by the distilling.

39. The method of claim 38 wherein the second gas stream is distilled in a distillation column and the disilane containing stream is obtained from a side stream of the distillation column.

40. The method of claim 37 further comprising making the first gas stream by a process comprising:
heating a monosilane containing stream to a first temperature within the first pyrolysis temperature range causing pyrolysis of the monosilane while avoiding exposing the stream to temperatures greater than about 20° C. by contacting the monosilane containing stream with a heated surface maintained at a temperature no more than about 20° C. above the first temperature for reducing the production of silicon and other higher silanes;
introducing the heated monosilane containing stream within the first pyrolysis temperature range into a first reaction zone; and
maintaining the temperature of the monosilane containing stream introduced in the first reaction zone within the first temperature range to form a higher silane reaction product from the introduced monosilane containing stream, wherein the first gas stream comprising disilane and monosilane exits the first reaction zone.

41. The method of claim 37 further comprising distilling the second gas stream in a distillation column, wherein the disilane containing stream is obtained from a side stream of the distillation column.

42. The method of claim 37 wherein the first gas stream contains predominantly monosilane.

43. The method of claim 40 wherein the surface comprises a surface of a wall.

44. The method of claim 40 wherein avoiding exposing the stream to temperatures greater than about 20° C. comprises modulating a power output for the heating of the monosilane containing stream to the first temperature to avoid exposing the monosilane containing stream to temperatures greater than about 20° C. above the first temperature for reducing the production of silicon and other higher silanes.

45. The method of claim 37 further comprising:
reacting a monosilane containing stream in the first temperature range in a first reaction zone to form a higher silane reaction product from the monosilane containing stream, wherein the first gas stream comprising disilane and monosilane exits the first reaction zone; and
reacting the second gas stream in the third trisilane producing temperature range in a second reaction zone to form trisilane.

46. The method of claim 37 further comprising making the first gas stream by a process comprising:
heating a monosilane containing stream to a first temperature within the first pyrolysis temperature range causing pyrolysis of the monosilane;
introducing the monosilane containing stream heated to the first temperature into a first reaction zone;
maintaining the temperature of the monosilane containing stream introduced in the first reaction zone within the first temperature range to form a higher silane reaction product from the introduced monosilane containing stream, wherein the first gas stream comprising disilane and monosilane exits the first reaction zone; and
modulating a power output for the heating of the monosilane containing stream to the first temperature to avoid exposing the first lower silane containing stream to temperatures greater than about 20° C. above the first temperature for reducing the production of silicon and other higher silanes.

47. The method of claim 37 further comprising making the first gas stream by a process comprising:
heating a monosilane containing stream to a first temperature within the first pyrolysis temperature range causing pyrolysis of the monosilane in a preheater;
introducing the monosilane containing stream heated in the preheater into a first reaction zone;
maintaining the temperature of the monosilane containing stream introduced in the first reaction zone within the first temperature range to form a higher silane reaction product from the introduced monosilane containing stream, wherein the first gas stream comprising disilane and monosilane exits the first reaction zone; and
modulating a power output of the preheater to avoid exposing the first lower silane containing stream to temperatures greater than about 20° C. above the first temperature for reducing the production of silicon and other higher silanes in the preheater.

48. The method of claim 47 wherein the preheater comprises one or more heaters having power outputs and wherein the modulating a power output of the preheater comprises modulating the heater power outputs.

49. A method for producing a higher silane from a lower silane comprising:
heating a first lower silane containing stream to a first temperature within a first pyrolysis temperature range causing pyrolysis of the first lower silane by contacting the first lower silane containing stream with a heated surface maintained at a temperature no more than about 20° C. above the first temperature for reducing the production of silicon and other higher silanes;
introducing the heated first lower silane containing stream within the first pyrolysis temperature range into a first reaction zone; and
maintaining the temperature in the first reaction zone within the first pyrolysis temperature range to form a higher silane reaction product from the first lower silane containing stream introduced into the first reaction zone.

50. A method for producing a higher silane from a lower silane comprising:
heating a first lower silane containing stream optionally comprising non-reacting diluents less than 20% by volume of said first lower silane containing stream to a first temperature within a first pyrolysis temperature range causing pyrolysis of the first lower silane in a preheater;
introducing the first lower silane containing stream heated in the preheater into a first reaction zone;

maintaining the temperature in the first reaction zone in the first pyrolysis temperature range, wherein said heating occurs in about 6 seconds or less and the first reaction zone has an average residence time of about 15 seconds to about 60 seconds; and modulating a power output of the preheater to avoid exposing the first lower silane containing stream to temperatures greater than about 20° C. above the first temperature for reducing the production of silicon and other higher silanes in the preheater.

51. The method of claim 50 wherein the preheater comprises one or more heaters having power outputs and wherein the modulating a power output of the preheater comprises modulating the heater power outputs.

52. A method for producing a higher silane from a lower silane comprising:

heating a first lower silane containing stream to be within a first pyrolysis temperature range causing pyrolysis of the first lower silane in a preheater;

introducing the first lower silane containing stream heated in the preheater into a first reaction zone;

maintaining the temperature in the first reaction zone within the first pyrolysis temperature range to form a higher silane reaction product from the first lower silane containing stream introduced into the first reaction zone; and modulating a power output of the preheater to avoid exposing the first lower silane containing stream to temperatures greater than about 20° C. above the first pyrolysis temperature range for reducing the production of silicon and other higher silanes in the preheater;

wherein the first lower silane and the pyrolysis temperature range is selected from the group consisting of monosilane with the pyrolysis temperature range of about 440° C. to about 460° C., and disilane with the pyrolysis temperature range of about 330° C. to about 350° C.

* * * * *